United States Patent [19]

Brown et al.

[11] Patent Number: 4,740,780
[45] Date of Patent: Apr. 26, 1988

[54] HEAD-UP DISPLAY FOR AUTOMOBILE

[75] Inventors: Steven E. Brown, Atlanta; John Weaver, Chamblee; Ronald A. Sargent, Atlanta; Scott W. Patterson, Norcross; Maurice L. Stephenson, Mableton, all of Ga.

[73] Assignee: GEC Avionics, Inc., Norcross, Ga.

[21] Appl. No.: 747,861

[22] Filed: Jun. 24, 1985

[51] Int. Cl.$^4$ .............................................. G02B 27/10
[52] U.S. Cl. .................................... 340/705; 350/174; 353/14
[58] Field of Search ..................... 340/52 R, 705, 784, 340/980, 97; 350/174; 353/14, 13; 358/250, 104

[56] References Cited

U.S. PATENT DOCUMENTS

| | | | |
|---|---|---|---|
| 2,178,637 | 11/1939 | Link | 340/980 |
| 3,230,819 | 1/1966 | Noxon | 340/980 |
| 3,280,625 | 10/1966 | Birmingham | 340/980 |
| 3,529,283 | 9/1970 | Emerson | 340/980 |
| 3,824,535 | 7/1974 | Rover | 340/980 |
| 3,848,974 | 11/1974 | Hosking et al. | 353/14 |
| 3,887,273 | 6/1975 | Griffiths | 353/14 |
| 3,932,861 | 1/1976 | Bull | 340/980 |
| 3,936,148 | 2/1976 | Ellis | 340/980 |
| 4,026,641 | 5/1977 | Bosserman et al. | 350/174 |
| 4,190,832 | 2/1980 | Mohler | 340/705 |
| 4,350,411 | 9/1982 | Rogers | 350/174 |

FOREIGN PATENT DOCUMENTS

| | | | |
|---|---|---|---|
| 3120601 | 5/1981 | Fed. Rep. of Germany | 340/784 |
| 0136534 | 2/1982 | Japan | 340/784 |

OTHER PUBLICATIONS

Design News, Sep. 3, 1984, pp. 86-88, "Moving Along with Mazda", by D. C. Brookman.

Omni Magazine, 1985, p. 42, "Holograms for your Car", by T. Onosko.
USA Today, 8/30/84, "Computers Fuel Autos' Rebirth", by J. Hillkirk.
Road Research Labortory, Mar. 1971, "Station Keeping Indicator".
Road Research Laboratory, Aug. 1968, "Head-Up-Display Speedometer".
Transport and Road Research Laboratory, May, 1975, "The Head-Up Display Speedometer".
Ergonomics, vol. 18, No. 1, pp. 89-100, 1975, "Control of Drivers' Speed . . . ", by K. S. Rutley.

Primary Examiner—John W. Caldwell, Sr.
Assistant Examiner—Alvin Oberley

[57] ABSTRACT

A head-up display for use in an automotive or other vehicle having limited space. The optical path from display symbol generator to a collimating lens is folded to fit in a relatively compact housing. Also shown is the use of the automobile windshield as a combiner glass for the display. Corrective lenses, and in particular crossed linear fresnel lenses, are used to correct for the astigmatism introduced by the geometry of the windshield. This provides a combination of optical powers for the display lens and the windshield which has the resultant effect of projecting an image from the image source to the driver's eye. The source is a high light output array of light-emitting diodes. A microprocessor based controller for detecting the status of inputs from the automobile is shown. Data is periodically loaded into a random access memory dedicated to controlling the display. When data is not being loaded, a separate address and timing generator is used to cause data from this memory to be displayed in a free-running mode.

10 Claims, 7 Drawing Sheets

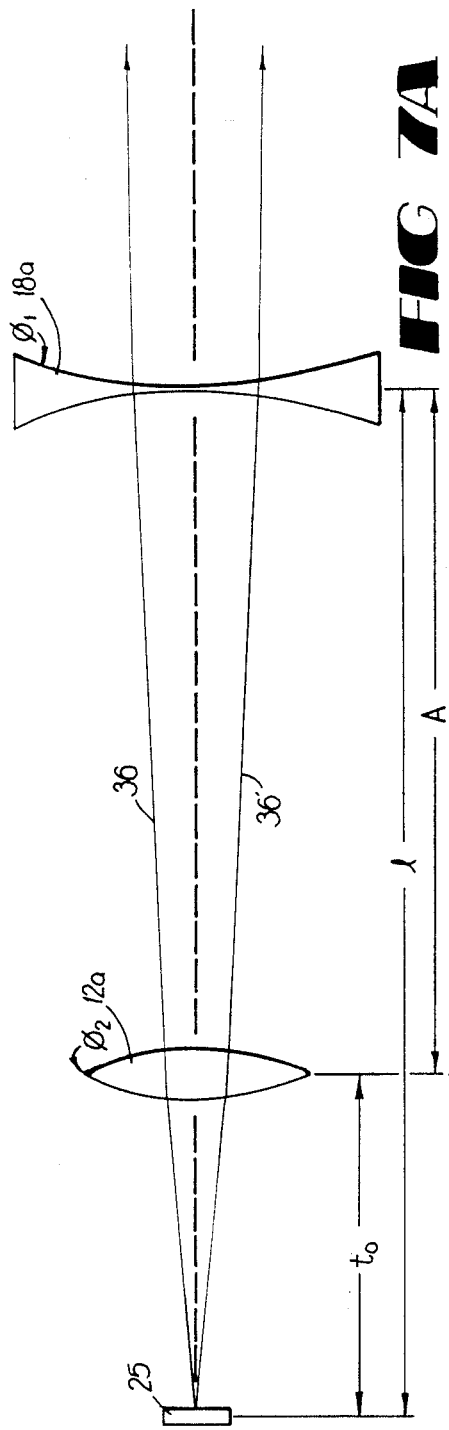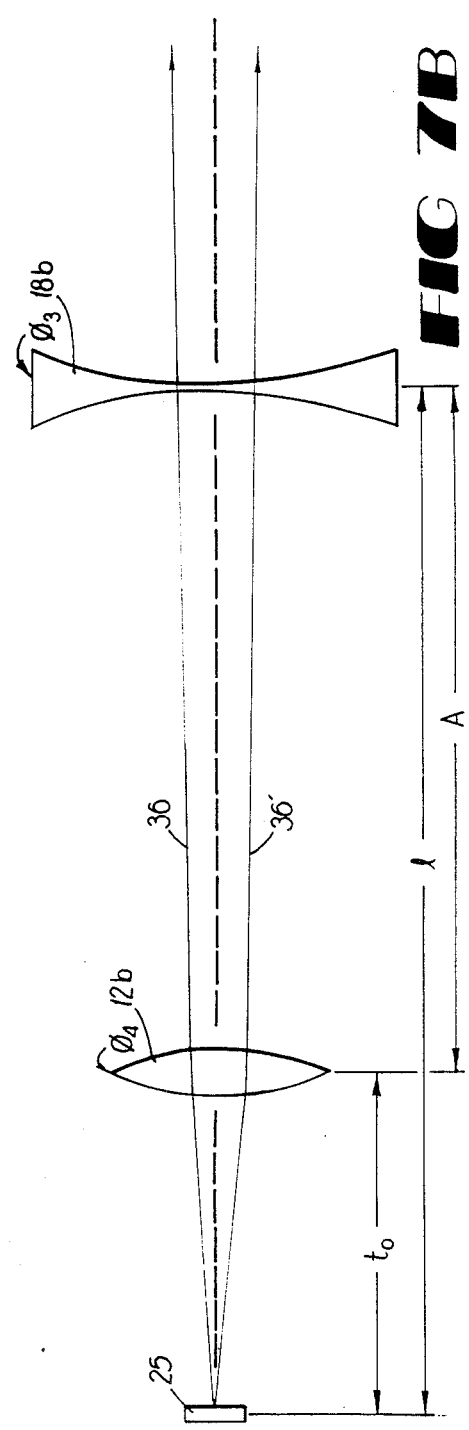

HEAD-UP DISPLAY FOR AUTOMOBILE

TECHNICAL FIELD

The present invention relates to instrument displays for automobiles, boats, and other craft equipped with what is normally referred to as a windshield or windscreen, and more particularly is a head-up display for displaying instrumentation information in such an environment.

BACKGROUND OF THE INVENTION

The use of basic instrumentation in private passenger automobiles has been common from the early part of this century when automobiles were first developed which could be driven at a greater rate of speed than it was safe for most drivers to operate them. In modern automobiles, the most basic instrument remains the speedometer which indicates to the driver the rate of speed at which the car is traveling. It is well known that driving at a relatively high speed for extended periods of time gives operators the illusion that their speed is lower than it actually is as they become acclimated to moving at a relatively high speed. This is particularly true on limited access highways.

Use of other automobile instrument indicators is also well known. In more recent years, there has been a growing trend toward standardized symbology. The International Standards Organization (ISO) has adopted a number of standard graphic symbols to indicate certain conditions existing in the automobile, such as headlamps on high beam, low fuel, low oil pressure, and the like. Conventional instrument displays in automobiles are located in an area in front of the driver, below the windshield or windscreen, which is normally referred to as the dashboard or instrument panel. As is well known, this arrangement requires drivers wishing to check their current rate of speed to momentarily lower their eyes so that they are focusing on the speedometer on the dashboard and not watching the road.

An automobile traveling 55 miles an hour is moving at slightly over 80 feet per second, and can travel a considerable distance in the time required for the operator to observe the speedometer and return his or her attention to the road ahead. Particularly under conditions of night driving, with headlamps on low beam, a considerable portion of the illuminated distance in front of the automobile, at the time the driver's attention was diverted to the dashboard, can be covered prior to the driver's visual attention being returned to the road ahead. This can create conditions of some danger under the circumstances described.

The problem is exacerbated in many European countries in which it is common to find drivers traveling on limited access highways at speeds in excess of 100 miles per hour. For example, an automobile traveling at 110 miles an hour is moving at a rate greater than 160 feet per second, and even momentary inattention to the road, particularly at night, can place the driver in circumstances in which a newly-seen danger in the roadway (when the driver's attention returns to the road ahead) cannot be avoided due to the speed of the car and the driver's reaction time.

Therefore, for safety reasons and reasons of general convenience, it has been suggested that a head-up type display, similar to those found in fighter aircraft, be used in the environment of an automobile to provide the driver with a means for reading the automotive instrumentation without removing the driver's visual attention from the roadway. It should be understood that this general suggestion was provided by the well known test pilot, General Chuck Yaeger, who is not a member of the present inventive entity. The suggestion made by General Yaeger was simply that some form of head-up display be applied to the environment of an automobile.

Head-up displays are well known in military aircraft, particularly modern sophisticated fighter aircraft. Generally characterized, a head-up display is a display apparatus which provides a visual representation of data to the pilot of the aircraft which is visually superimposed on the pilot's normal field of view through the aircraft windshield to the outside world. In most fighter aircraft, a cathode ray tube is the source of the visual image for the head-up display. In conventional aircraft head-up displays, a zero power dielectric coated glass surface is included between the location of the pilot's eyes and the aircraft windshield so that the pilot will see both the visual information from the CRT, and can see outside the aircraft. This glass surface is normally referred to as a combiner because it is used to combine visual images from outside the aircraft with those generated by the CRT. The real world overlay positioning of the symbology must be extremely accurate; less than 1 milliradian deviation for military usage. For an automobile this overlay is of minor importance. An optical focusing system which normally includes at least one lens and one mirror focuses information from the CRT onto the combiner glass. The dielectric coating is used to increase the reflectivity so that sufficient light from the CRT image reaches the pilot's eyes.

In addition to reproduction of normal flight instruments, head-up displays in fighter aircraft also include targeting displays and other information for the pilots. In other words, a head-up display may be used to generate what the modern analog of the crosshairs of a gun sight which will be used in aiming missles and the like in combat. Thus, in fighter aircraft head-up displays, the physical location of the CRT images for the head-up display may be critical.

Head-up displays in fighter aircraft were developed, in large part, because of the very high speeds these planes travel. For example, modern fighter aircraft traveling at Mach 2 are traveling in excess of 2200 feet per second which is more than 0.4 miles per second. Needless to say, even momentary inattention to the world outside the airplane, in order to observe an instrument panel, can be very dangerous for the operator of the aircraft.

Because of the types of information displayed in fighter aircraft head-up displays, as described above, such displays are designed to have a large total field of view, a relatively small instantaneous field of view, and thus a relatively small eyebox. In the parlance of such displays, the eyebox is a description of a three-dimensional space in which the viewer's eyes may be located to properly view the display.

Intuitively, the small eyebox resulting from a large total field of view and small instantaneous field of view results in the fact that fighter aircraft head-up displays are normally arranged so that the pilot's eyes are very close to the combiner glass. In most fighter aircraft, there is a relatively large volume of space available within the aircraft in front of the location of the combiner glass. This allows a relatively long straight optical path to be provided between the CRT source of the images for the head-up displays and a mirror which reflects this image up to the combiner glass.

The inventors of the present invention encountered a number of practical problems in attempting to make a straightforward transfer of head-up display technology used in fighter aircraft to the environment of an automobile. In essence, it is impractical to simply install fighter aircraft head-up display technology into the environment of an automobile. Given the suggestion of using a head-up display, such as used in a fighter aircraft in an automobile, it may well be obvious to simply transport the equipment normally constituting the head-up display to the automotive environment. However, this is impractical for a number of reasons. It was the overcoming of the problems encountered, and the impracticality of making the straightforward transfer referred to above, which resulted in the present invention.

Further, some information available at the periphery of the total field of view is seen by the pilot only as he intentionally moves his head from side to side. The net effect is similar to that of looking at a panoramic scene through a knot hole in a fence. This feature is considered desirable in the case of the highly trained pilot; less frequently used symbology information disappears to the side until referenced, reducing clutter in the central image, and lessening any information overload condition the pilot may experience.

First, it is considered impractical from the viewpoint of cost, to simply apply aircraft head-up display technology to the environment of an automobile. The cost of such a head-up display would be an appreciable fraction of the normal cost of the automobile. Thus, the benefits to be derived from a head-up display would not justify the cost of installing such a device.

Secondly, head-up displays of the type used in military aircraft occupy a substantial volume. A straightforward installation of an aircraft type head-up display would require either a large volume to be placed above the normal line of the automobile hood, or breaking through the firewall into the engine compartment in a manner which is deemed to be wholly impractical. Similarly, there is insufficient room between the firewall and the dashboard to allow practical redesign of an otherwise normal passenger automobile to accommodate a conventional head-up display. Thus, application of head-up display technology to the environment of an automobile requires a way to reduce the volume occupied by the display.

Thirdly, the inventors have discovered that to design a practical head-up display for an automobile requires a relatively large eyebox since the physical location of the operator's head with respect to the combiner will vary much more widely in a passenger automobile than in a fighter aircraft. There is a considerable nonuniformity in the height of drivers and thus the vertical position of the driver's head and eyes. Similarly, the great variation in the length of person's legs, and their preference for resting positions for their legs during operation of an automobile has led to design of a wide range of adjustments for the distance from the driver's seat to the dashboard and windshield area of a car.

In contrast to the aviation setting, the automobile driver requires a relatively small amount of information, in a relatively small angular space, which is comfortably visible without head motion to view all the symbology or training in its use. Furthermore, it is believed that a practical head-up display for an automobile should provide a fairly compact instrument cluster which is visible from any area in space in which a driver's eyes might be located. This leads to the need to design a head-up display with a large eyebox determined by an instantaneous field of view which is equal to or exceeds the total field of view of the display.

Again, as a cost consideration, use of a CRT as the image source for the head-up display is impractical. This has led the inventors to the use of a high output light-emitting diode array as described hereinbelow.

Additionally, it should be understood that in some ways the environment of a conventional passenger automobile is more harsh on such a display than the environment of high performance fighter aircraft. In particular, a head-up display is one which includes an optical path from the display source to the combiner which is located at or near the windshield of the vehicle in which the display is installed. While military aircraft are treated with special care while parked on the ground and out of service, it is well known that automobiles are often left standing for extended periods of time in environments which range from extreme cold to extreme heat and sunlight.

The temperature within an automobile parked in the sun on a hot day, can easily exceed 140° F. Furthermore, an optical path from the source, through the exit orifice up to the combiner, normally includes an axis which is substantially perpendicular to the ground. This means that when the sun is overhead, there is a small but finite probability that there may be a direct optical path coupling the sun back to the source of the display image. This can lead to the focusing of very intense visible and infrared light rays at the display image which may damage an LED array of the type employed in the preferred embodiment. Therefore, heat dissipation at the image source of the display, as well as protection from the sunlight becomes an important factor.

All of the foregoing problems have been addressed in the creation of the present invention with respect to automotive head-up displays irrespective of whether a separate combiner is provided.

However, research has shown that operators of automobiles have a negative reaction to a separate combiner glass used in a head-up display in the environment of an automobile. Thus, in creation of a head-up display for an automobile, it is preferred to have the ability to use the conventional automotive windshield as a combiner. This leads to additional problems not present in the design of head-up displays for military aircraft.

First and foremost is the fact that most automotive windshields are not spherical curved surfaces. In modeling the shape of an automotive windshield, it has been found that the regular geometric solid they most closely resemble is the interior surface of a portion of a torus. This leads to two problems in using an automotive windshield in place of a conventional flat combiner. First, the curvature of the windshield gives it a finite focal length and thus the windshield has optical power. Conventional combiners for head-up displays are flat, with a focus at infinity and thus have no optical power.

Secondly, because the windshield approximates the inside surface of a torus, its power is astigmatic. Additional astigmatism occurs due to the angular tilt between the windshield normal and the optical axis of the display unit. Thus, correction for this astigmatism must be added to the optics of the display unit. Some form of predistortion to correct for the astigmatism caused by the reflection of light from the windshield is necessary.

In summary, the present invention was necessitated by the problems encountered in attempting to make a practical implementation of the suggestion that a head-up display of the type used in fighter aircraft be applied to the environment of an automobile.

SUMMARY OF THE PRESENT INVENTION

The present invention provides a head-up display appropriate for use in a passenger automobile or other vehicle by providing a symbol generator using a relatively small array of selectively operable light-emitting elements, preferably light-emitting diodes, to generate the symbols. This symbol source is at the object position of an optical path in which a quasi-collimating lens is placed. The light rays are combined by a combiner element, which can either be a separate combiner or, in the preferred form of the present invention, the windshield of a conventional automobile. Images from the external world in front of the car are combined with the collimated rays from the symbol generator so that the operator sees the symbol output without having to remove his or her eyes from the road to look at instruments on the dashboard.

In order to construct practical embodiments of the present invention that may be readily placed in the dashboard area of a conventional automobile, within normal design constraints for such automobiles, the optical path between the symbol source and the collimating lens is folded. In the preferred form of the present invention, the path makes two folds and two mirrors are used.

Since it is desirable to keep the image of the symbols within a relatively compact space in the driver's field of view, the preferred form of the present invention provides that one subset of the generated symbols are illuminated constantly and a second subset of the possible symbols is illuminated on a time division multiplexed basis. The second set of symbols includes those which are normally displayed by warning lights on the dash board of an automobile indicating some condition which may hinder safe operation of the automobile and which needs correcting. For example, the second set of symbols includes an indication that the car is low on fuel, that the water temperature is abnormally high, that a door is ajar, the seat belt not fastened, and so forth. In the preferred form, the symbology which is constantly provided displays the speed of the automobile, duplicating information from the speedometer, and when the headlamps are on high beam, a high beam symbol is constantly provided.

According to a preferred form of the present invention, when the controller for the symbol generator detects that one and only one of the second set of symbols should be displayed, this symbol is displayed continuously. When more than one condition exists which requires display of a member of the second set of symbols, the symbols are displayed sequentially.

An important aspect of the present invention is that the sizes of the source of the images and the exit pupil from the optical path between the image source and the collimating lens, the length of that optical path, and the distance from the collimating lens to a three-dimensional space where the driver's eyes will probably be located, are selected such that the total field of view for the driver with respect to the symbol generator is much smaller than the driver's instantaneous field of view at the exit pupil.

As noted above, this has been done in order to provide a relatively large "eye box". The eye box for a head-up display is the three-dimensional space in which the user's eyes may be placed and still view appropriate portions of the display. Due to the great variation in height of drivers and distance for driver's eyes from the windshield (or separate combiner if used), it is necessary to provide a large eye box so that some drivers will not have portions of the symbols generated by the head-up display hidden from view. Therefore, in order to create the present invention, it is necessary to adopt a design approach which was substantially the opposite from that normally used in conventional head-up displays for aircraft.

According to the preferred form of the present invention, a substantially conventional automobile windshield (as opposed to certain truck windshields which may be flat) is used as a combiner for combining images of the road ahead with images from the symbol generator. Since virtually all modern automobile windshields possess curvature, they also possess optical power which will cause the light rays from a conventional head-up display optical system to converge and become distorted. Therefore, the preferred form of the present invention employs a lens at the exit pupil which predistorts the image exiting the above-mentioned optical path to compensate for the optical power of the windshield. In other words, the preferred embodiment of the present invention provides a lens of optical power which is selected so that the combination of the optical power of the lens and the optical power of the windshield (considered as a reflecting surface) combine to produce a virtual image at a preferred distance of fifteen feet from the driver's eye.

Additionally, the most preferred form of the present invention is designed to be used with conventional windshields which are astigmatic. Therefore, the lens at the exit pupil of the preferred embodiment of the present invention is one which will correct an astigmatism. The preferred embodiment of the present invention employs a crossed linear fresnel lens of a type originally used as a solar collector to compensate for the astigmatism of the automobile windshield. It is preferred that the lens at the exit pupil be made of polycarbonate plastic so that it can properly operate, and not be damaged in extremes of the temperature environment normally encountered in an automobile.

It is believed by the inventors that certain modern high temperature acrylics (P-MMA or polymethyl methacrylate) with enhanced high temperature characteristics have been developed in laboratory environments. These materials are further believed to have molding characteristics superior to polycarbonate plastics. When such acrylics become commercially available at reasonable cost, it is believed that they will be the preferred material for constructing lens for use in embodiments of the present invention.

Therefore, it is an object of the present invention to provide a head-up display appropriate for use in an automobile which will give the driver a visual image, superimposed on the image of the road ahead, of information normally provided by dashboard instruments and warning lights.

It is a further object of the present invention to provide such a display which is confined to a physical housing which may be readily installed in the dashboard area of a conventional passenger automobile.

It is a further object of the present invention to provide such a display in which a matrix of high output light-emitting diodes is used as the symbol source.

It is still a further object of the present invention to provide a head-up display for an automobile with a relatively small total field of view and which will provide some of the information duplicating certain instruments constantly to the driver while providing other warning light type of information sequentially when a condition of the automobile is such that more than one warning symbol should be displayed.

It is still a further object of the present invention to provide a head-up display for use in a conventional passenger automobile in which the windshield of the automobile serves as the display combiner and wherein the display is provided with lenses which correct the astigmatic optical power of a conventional automobile windshield.

It is a further object of the present invention to provide a head-up display for an automobile which can be manufactured relatively inexpensively and can withstand the environmental extremes normally encountered for passenger automobiles.

That the present invention accomplishes these and other objects will be appreciated from the detailed description of the preferred embodiment below.

BRIEF DESCRIPTION OF THE DRAWINGS

FIG. 7, consisting of FIGS. 7A and 7B, are diagrams showing the optical path in the vertical and horizontal planes for an astigmatic windshield and a crossed fresnel lens used in the preferred embodiment.

DETAILED DESCRIPTION

Figure 1:
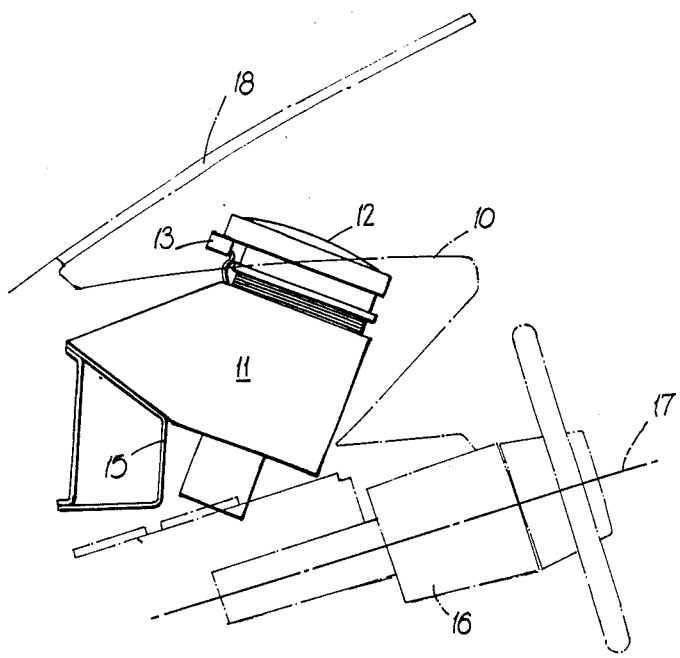
FIG. 1 is a side elevational view of the preferred embodiment installed in a conventional dashboard, with other elements in the dashboard broken away.

Turning now to the drawing figures in which like numerals reference like elements throughout the several figures, the preferred embodiment will now be described. FIG. 1 shows a side view of the preferred embodiment mounted in the dashboard area 10 of a conventional passenger automobile. The preferred embodiment is electrically interfaced to the wiring harness of the car (not shown).

The preferred embodiment is enclosed within a housing 11 with a lens 12 at the top. Housing 11 is secured to a mounting bracket 15 secured to the firewall or other stable portion of the car's body. A portion of the steering column is shown at 16 with the longitudinal axis of a column being represented by line 17. The portion of the automobile windshield 18 is shown above lens 12. A photoelectric device 13 is mounted under the lens and faces the front of the automobile to serve as an ambient light detector.

From the relative positions of lens 12 in windshield 18 it will be appreciated that the image seen by the driver of such an automobile will appear to be near the lower portion of the windshield. This is because it is generally inappropriate to provide a head-up display which will appear in the center of the driver's field of view. Therefore, while the preferred embodiment provides a head-up display, in that the field of view of the driver does not have to be diverted from the road to focus on a dashboard, it may be considered a "chin down" display in that it is preferred to provide an apparent location for the image on the lower portion of the windshield.

This prevents the driver from having to constantly look through the displayed image to see the road ahead, but allows the driver to glance down toward the image or observe a change in the display with his peripheral vision while still having the road in front of the car within his or her field of view. The advantage of such an arrangement is that any sudden movement or the like within the field of view of the road ahead, such as a child darting into the street, will immediately attract the driver's attention. Also, the driver's eyes will not have to refocus because of the plane of projected image of the display.

Figure 2:
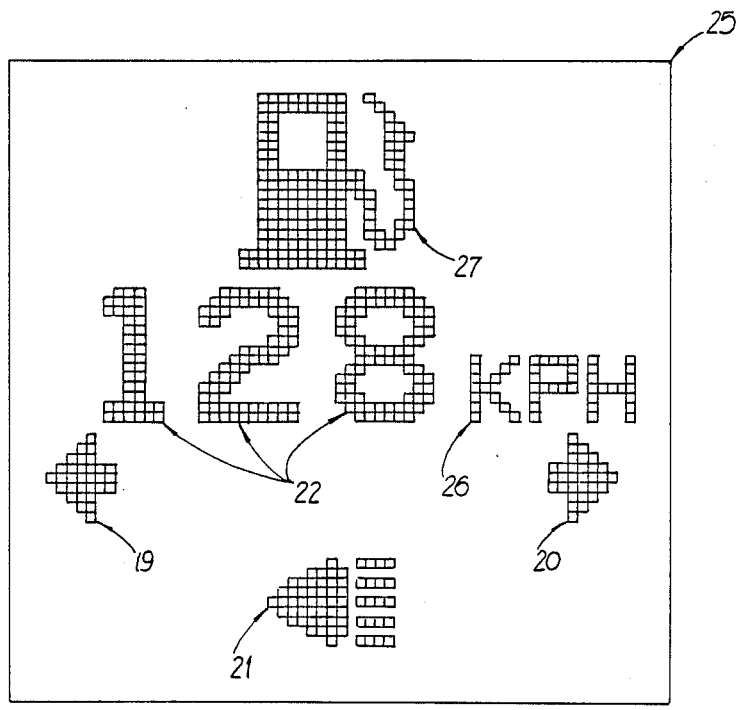
FIG. 2 is a plan view showing representative symbology presented to the driver by the preferred embodiment.

FIG. 2 shows a typical image displayed by the preferred embodiment. Prototypes of the preferred embodiments were first constructed using high density, high light output light-emitting diode arrays currently manufactured by Litton Industries. These arrays are 64×64 and therefore provide the ability to display a relatively large number of symbols with good resolution. The particular technology employed by Litton Industries to produce arrays of very high light output, and high physical density is proprietary to Litton. However, LED arrays such as those shown in British Pat. No. 1,532,286 may also be employed to construct practical embodiments of the present invention.

While the preferred embodiment of the present invention was originally constructed using a 64×64 LED array, it is believed that the best mode of practicing the present invention is one for which a similar geometric matrix is constructed, but only those portions which will ever become illuminated under all possible display conditions are actually filled with diodes. Furthermore, it is considered preferable to hard wire certain elements of the array together for portions of the array which are dedicated to the display of one and only one symbol.

Exemplary portions of the array for the preferred embodiment include the diodes forming symbols 19 and 20, the left turn and right turn signals, respectively. Also included in this class of symbols is symbol 21, the high beam indicator. The diodes comprising symbols 19, 20 and 21 are dedicated to those symbols. In other words, these elements of the array will only become illuminated when the particular symbol in which they are used is on.

A three-digit section of the array shown as 22 provides a three-digit output indicative of automobile speed. Section 26 is preferably selectively changeable between the letters "K" and "M" so that the output may be switched between miles per hour and kilometers per hour. Since segment 22 of display 25 is, in the preferred embodiment, dedicated to providing numerical outputs, elements of array 25 in this segment may be electrically connected so as to duplicate the geometry of a conventional seven-segment digit display. Such an arrangement could be used to simplify the logic driving the symbol generator. Also, the most significant digit of section 22 may be dedicated to being a one if the automobile manufacturer using the present invention does not wish to display speeds in excess of 200 kilometers per hour to the user.

Section 27 of array 25 is the scanned portion of the display in which the second set of symbols referred to above is displayed. As noted above, these symbols normally duplicate the function of dashboard warning lights, and therefore the symbols will from time-to-time be referred to as warning light symbols in this specification.

The particular symbol shown in Section 27 in FIG. 2 is the LED pixel representation of the International Standards Organization symbol for a gas pump, indicating that the car is low on fuel. As noted above, a plurality of other such symbols may be generated in this area, in a manner described hereinbelow.

In the preferred form of the present invention, elements of array 25 are used to display standard automotive symbols as defined by the International Standards Organization (ISO). It has been found that most of the ISO symbols for automobile warning lights and status indicators may be constructed from a relatively small subarray. In the embodiment illustrated in FIG. 2, the gas pump is displayed in an 18×18 subset of array 25. In order to keep the controller for the preferred embodiment (described hereinbelow in connection with FIGS. 8 and 9) as simple as possible, it has been found preferable to limit segment 27 to a 16×16 or 16×32 subarray. This constrains the number of individual diodes used to an even power of two, thus simplifying the writing of information in and out of memory.

Symbol 21 is the ISO symbol for high beam. However, that standard defines this display as being in the color of blue. Since to date, no one has constructed a light-emitting diode which emits blue light, the standard may be departed from to that extent. Alternately, an incandescent light source, behind an appropriate mask with a blue filter may also be employed to construct embodiments of the present invention, if the user desires to comply strictly with the ISO standard.

In connection with FIG. 2, the multiplexing of symbols within subarray 27 will now be explained. As noted above, it is considered important to keep the image from the head-up display presented to the driver relatively compact. This is in part due to the fact that compactness of the image is desirable in and of itself, and also due to the fact that a relatively small total field of view must be employed in order to meet the desired constraint that the total field of view be considerably smaller than the instantaneous field of view. This constraint prevents the image from disappearing as the driver makes slight adjustments in his or her position on the car seat. Also, it is impractical from a cost standpoint to increase the number of elements in array 25 so that a large number of ISO warning light symbols could be displayed simultaneously.

Therefore, the preferred embodiment of the present invention will display an appropriate symbol in subarray 27 when one and only one warning light symbol needs to be displayed to the driver. Such a condition is illustrated in FIG. 2. If it is assumed that the only condition of the car which would require activation of a warning light symbol is the fact that the car is low on fuel, the display as shown in FIG. 2 would be constantly presented to the drive. This of course assumes that symbols 19 and 20 are not constantly illuminated, but only intermittently illuminated when the respective turn signals are activated.

If it is assumed for the moment that the car is both low on fuel and a door is ajar, the preferred embodiment will alternately display in subarray 27 the ISO symbol for low fuel shown in FIG. 2 and the ISO symbol for door ajar. This will bring all conditions indicated by warning light symbols to the attention of the driver without unduly increasing the size of the display or the symbol generator which provides it. Furthermore, if more than one condition exists for which illumination of a warning lamp is appropriate, it is believed additionally beneficial that the symbols flash on and off in sequence in order to attract the driver's immediate attention that things are not going well in the car.

In the event that more than two conditions exist which indicate that display of a warning light symbol is appropriate, all of the symbols will be provided, cyclically in subarray 27.

From the foregoing, it will be appreciated that a number of alternate display formats are possible in an LED array of the type shown in FIG. 2. For example, alternate preferred forms may include alphabetic presentations of warnings in subarray 27. For example, a display of "brake" or "door ajar" may be used rather than any pictorial or icon symbology.

Also, the inclusion of a dedicated portion of the LED array for a linear tachometer display has been suggested. Such a display includes a bar graph (preferably filling from left to right) which extends its length as engine RPM increases. It also may be preferable to include a constantly illuminated red portion at the extreme end of such a display to indicate the conventional "red line" warning that engine RPM has reached a dangerous level.

The electronic controller for the output of array 25 will be described in detail below. First the optics of the preferred embodiment will be described.

Figure 3:
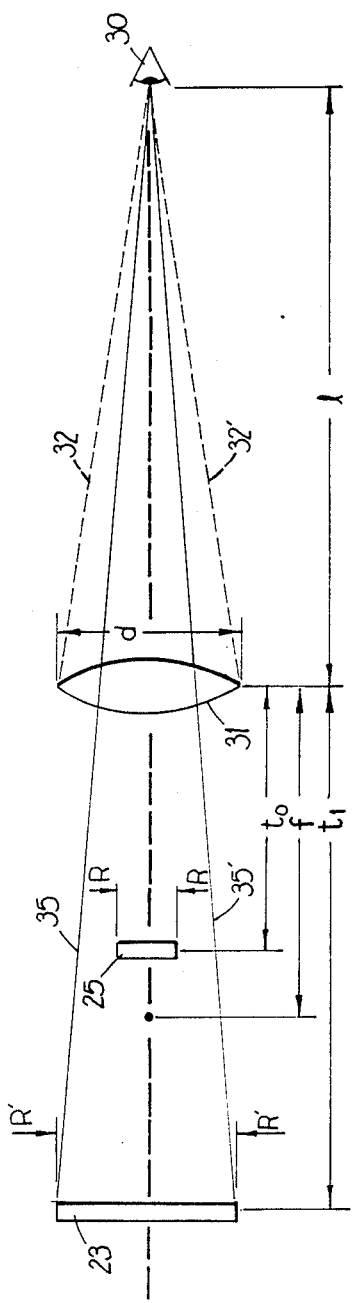
FIG. 3 is a diagram showing the relationship between the total field of view and the instantaneous field of view of the present invention.

The optics of the preferred embodiment will be described in connection with FIGS. 3-7. FIG. 3 shows an optical path from array 25 to the eye 30 of the driver. FIG. 3 is drawn in terms of a linear optical path for the sake of simplicity. The optical path between array 25 and a magnifying lens 31 is of a length $t_0$, such that the ratio of $t_0$ to $f_1$, the focal length of the lens, yields the desired image size R', shown at 23, and distance $t_1$. Distance d, the width of the lens, defines the size of the exit pupil for the optical path. In the preferred embodiment, the exit pupil is rectangular; five inches by six and one-half inches in the horizontal and vertical directions, respectively. However, for purposes of the principle illustrated in FIG. 3, the exit pupil may be taken to have a single dimension d.

A variable distance shown as l extends between eye 30 and the exit pupil at 31. The instantaneous field of view expressed as an angular measurement in radians is equal to arctan (d/l). The total field of view is also an angular quantity expressed as $R/t_0$. In the preferred embodiment, array 25 is approximately 0.77 inches square. With exit pupil 31 being six or seven inches wide, it will readily be appreciated that when distances $t_0$ and l are on the same order of magnitude (which they are in the preferred embodiment), the total field of view will be smaller than the instantaneous field of view.

This is diagrammatically represented in FIG. 3 wherein the angular instantaneous field of view of the person having eye 30 is represented by dashed lines 32 and 32' and the total field of view is represented by solid lines 35 and 35'. Therefore, it is much preferred in practical embodiments of the present invention to have the exit pupil to be of sufficient dimensions to define an IFOV which is at least 1.5 times greater than the TFOV defined by array 25. The array size R is considered the maximum distance between any two lighted elements in any possible display state of array 25.

In order that the preferred embodiment will be fully understood, it should be appreciated that the folding of the optical path referred to above takes place along the optical path in the portion represented by distance f. It should further be appreciated that reflection from the combiner, either a separate combiner or the automobile windshield, takes place somewhere along the portion of the optical path shown by distance l. The distance between the exit orifice at 31 and the windshield will remain constant, but the distance l from the user's eye 30 to the exit orifice at 31 will be variable.

Figure 4:
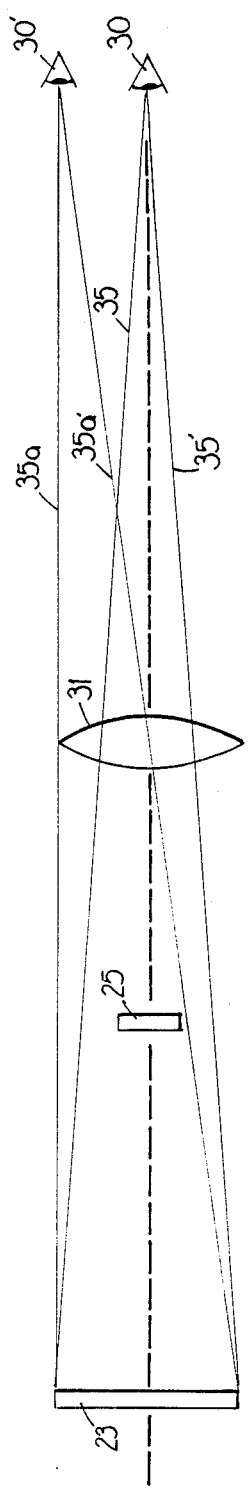
FIG. 4 is a diagram illustrating the eye box of the present invention.

FIG. 4 illustrates the above-described advantage of keeping the instantaneous field of view larger than the total field of view. The user's eye 30 and the total field of view defined by lines 35 and 35' in FIG. 4 is substantially the same as shown in FIG. 3. However, a second position for the user's eye is also shown at 30'. The total field of view for the eye in this position is shown by solid lines 35a and 35a'. It can be seen from inspection of FIG. 4 that the user's eye 30 may be move a considerable distance, and still the entire display generated by array 25 will be within the field of view for this particular eye. Since the distance between the eyes shown at 30 and 30' can represent either horizontal or vertical movement, and the exit pupil at 31 can represent either the horizontal or vertical exit pupil dimension, the relatively large eye box provided by the present invention, to accommodate different sized drivers and different horizontal positions in which they may seat themselves behind the wheel, will be readily appreciated.

It should be noted that, strictly speaking, the instantaneous field of view in the horizontal plane is the overlapping instantaneous field of view for each eye. However, the eyes of an average person are spaced approximately two inches apart and in most automotive applications, distance l will be approximately forty-two inches. Therefore, there is a small diminution in the instantaneous field of view for binocular vision than is illustrated in the single eye model shown in FIGS. 3 and 4.

Figure 5:
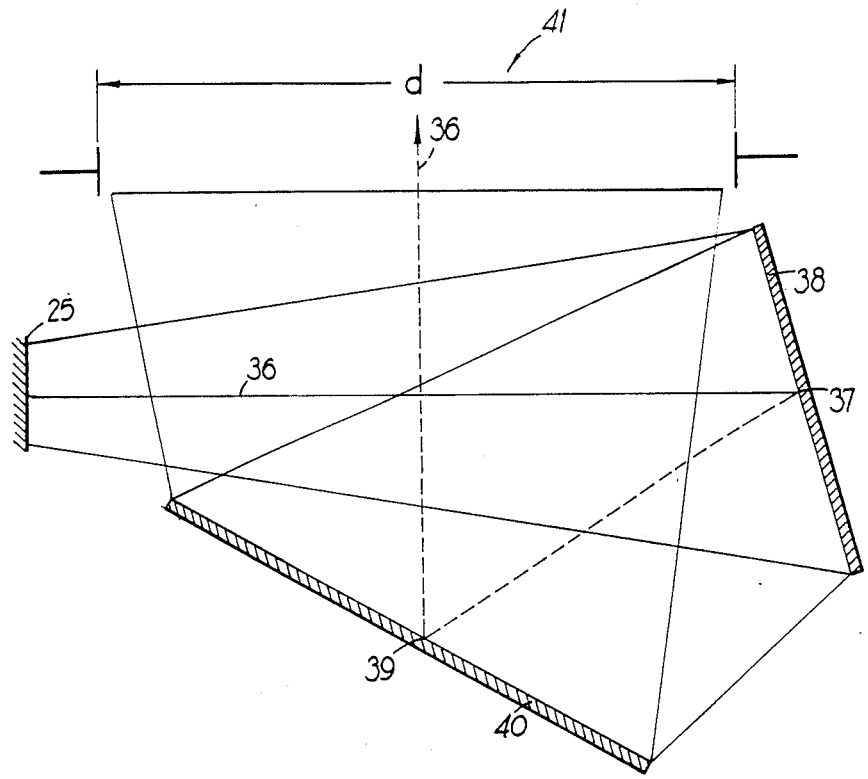
FIG. 5 is a diagram showing the folded optical path of the preferred embodiment.

FIG. 5 shows the folded optical path used in the preferred embodiment. An axial light ray 36 is shown exiting array 25. It travels from array 25 to point 37 where it strikes first mirror 38 at an angle of incidence of approximately 16¼°. Ray 36 is shown in phantom as reflected from mirror 38 to point 39 where it strikes second mirror 40. The angle of incidence and reflection at mirror 40 is approximately 29°. Ray 36 then proceeds out the exit orifice shown at 41 having dimension d in the plane of the paper.

The magnifying lens (not shown in FIG. 5) which is inserted at exit pupil 31 has a focal length, f, such that the ration $f/t_0$ (where $t_0$ is the distance from the exit pupil center to LED array center) gives the virtual image the desired size and distance from driver's eye. Viewing FIGS. 1 and 5 together, it will be appreciated that the preferred embodiment accomplishes the above-stated object of the present invention to provide a sufficient path length for a magnifying lens, such that the focal length may be relatively long (thereby reducing the necessary power of the lens and thus its expense) and still fit compactly into housing 11 (FIG. 1) so that the entire assembly may be installed in the dashboard area of a passenger automobile.

Figure 6:
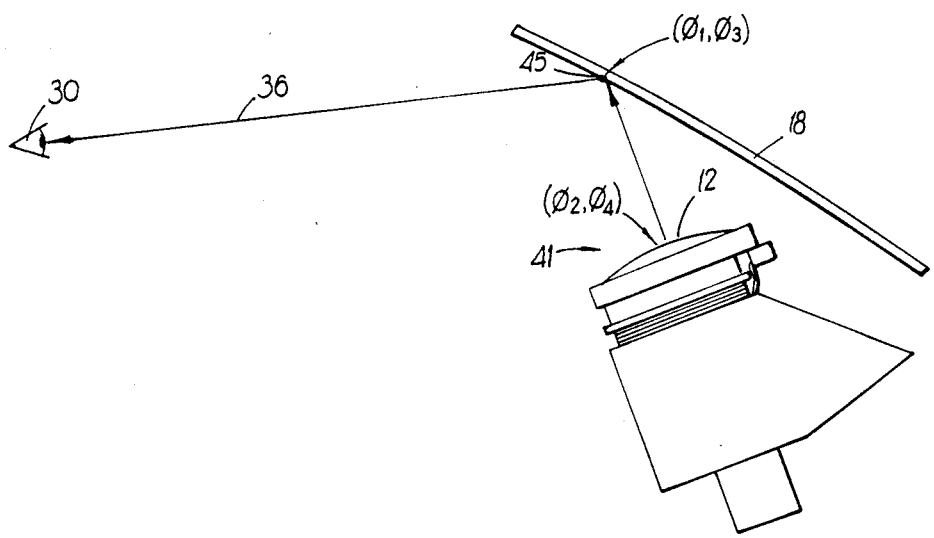
FIG. 6 is a side view of a ray exiting the preferred embodiment and being reflected from a windshield.

FIG. 6 simply illustrates the axial ray 36 exiting pupil 41 through lens 12 and being reflected off windshield 18 at point 45. From point 45, the ray travels toward the eye 30 of the driver.

As noted above, the preferred form of the present invention is designed to be used with a conventional automobile windshield 18 serving as the combiner for the head-up display. This is because actual experiments have indicated that drivers react negatively to the use of a separate combiner glass in such a display.

However, as described in the background of the invention section of this specification, virtually no modern automobile windshields possess a planar geometry at the lower portion of the windshield where ray 36 must strike in order to achieve the "head-up" and/or "chin down" display characteristics described above. This statement also holds true for virtually any portion of the windshield which the designer of an embodiment of the present invention might choose to use as a combiner glass.

Since the geometry of the windshield is curvilinear, and since windshield 18 is tilted such that the normal to point 45 forms a large angle with respect to ray 36, it possesses astigmatic optical power when used as as reflector in the general case. This prevents the straightforward application of conventional head-up display designs directly to the problem of an automotive head-up display since one cannot simply select the magnifying lens at exit pupil 41 to have a focal length corresponding to the optical path between the image source and the exit pupil.

The optical power of the windshield can be used to some advantage in that, depending on the sign of the optical power in a particular plane, it can reduce the necessary power of the lens 12 at the exit pupil in that plane, thus reducing the thickness and expense of the lens.

As noted above, the regular geometric surface which the portion of interest of windshield 18 most closely resembles is the inside surface of a torus. The geometry of this section of conventional automobile windshield is arranged so that the axis of the torus is mutually perpendicular to the auto centerline of travel, and the vertical. It will be readily appreciated that a collimated beam of light striking such a surface will encounter two distinct radii of curvature for the vertical and horizontal planes. Therefore, as noted above, the geometry of the inside surface of the windshield makes the windshield astigmatic. If the conventional optical system of a preexisting head-up display were simply installed in an automobile trying to use the windshield as a combiner, the image viewed by binocular vision would be displaced astigmatically and the driver would tend to see a double image. The torus model of the windshield is not necessarily accurate, and in general, the windshield is a more generalized compound curve.

The preferred embodiment of the present invention overcomes this problem by "predistorting" the light wavefronts leaving exit pupil 41 to compensate for the astigmatism of windshield 18. The preferred form of this compensation is implemented by making lens 12 a crossed linear fresnel lens, but other astigmatic lenses may be used in constructing embodiments of the present invention.

As is known to those skilled in the art, a fresnel lens is one which uses piecewise discontinuous portions of relatively thin material to approximate the optical characteristics of a much thicker lens of equal power. It provides the ability to achieve a great deal of optical power without the physical bulk or necessary expense of using a very thick high-powered lens. Naturally, there is a tradeoff in the use of fresnel lenses, the main one being light scattering introduced at the discontinuities between segments of the lens.

Currently, cross-linear lenses are available from 3M Company in a process made according to the disclosure of U.S. Pat. No. 4,385,808.

At the present time, the inventors of the present invention believe that the use of polycarbonate plastics as a lens material constitutes the best mode of practicing the invention since such plastics exhibit physical and thermal characteristics which allow them to survive the environmental conditions encountered in an ordinary passenger automobile, yet they are inexpensive enough to justify their inclusion as an automobile accessory. For the power of the design lens, a conventional lens of one or possibly two elements would be too thick at the lens poles to be readily molded out of polycarbonate, the thin profile of the fresnel lens lends itself to the use of polycarbonate as a material of choice.

New high temperature acrylics of various types show promise for use in this application, allowing the use of a conventional (non-fresnel) anamorphic lens which would have sharper imaging characteristics.

The notation $\phi_1$ through $\phi_4$ on FIG. 6 is used to indicate that the windshield at point 45 exhibits optical power $\phi_1$ in the tangential plane and optical power $\phi_3$ in the sagittal plane, the planes being defined with respect to the windshield. As is known to those skilled in the art, the optical power $\phi$ of a lens or mirror for a given plane is the reciprocal of the focal length of that mirror for rays lying in the respective plane.

Similarly, the notation on FIG. 6 indicates that the cross-linear fresnel lens embodying lens 12 at exit pupil 41 is designed so that it possesses optical powers $\phi_2$ in the tangential plane and $\phi_4$ in the sagittal plane. The tangential plane is defined as being the same as the "incident" plane, or that plane containing the normal to the windshield at 45 and ray 36.

FIGS. 7A and 7B diagrammatically depict implementation of the above-described compensating lens. FIG. 7A represents the optical path in the tangential plane and FIG. 7B represents the optical path in the sagittal plane. On both Figures, a total effective focal length l is shown divided into two segments A and $t_0$. Path length $t_0$ extends between LED array 25 and lens 12.

In FIG. 7A, the representation of the lens is shown as 12a to indicate the effective shape of the magnifying lens in the tangential plane. Similarly, lens 12b in FIG. 7B represents the effective geometry of the sagittal portion of the magnifying lens embodying lens 12. In the Figures, the optical power of the windshield in the tangential plane is represented by a lens shown as 18a and the optical power for the sagittal plane is represented by the lens shown as 18b. It should be understood that the representation of windshield 18 as lenses 18a and 18b in FIG. 7 is made for the sake of simplicity since, in the present invention, the windshield is acting as a mirror having the same optical power. However, for the sake of simplicity, FIG. 7 has been drawn using lenses to indicate the optical power of the windshield in order to demonstrate the imaging of light from source 25 over the total optical path length l between LED array 25 and the point at which the light is reflected from the windshield toward the eye of the user.

As may be seen from inspection of FIG. 7, it is preferred to have different optical powers $\phi_2$ and $\phi_4$ for the tangential and sagittal planes of lens 12.

While the inner surface of the windshield used as a combiner in a conventional automobile somewhat resembles the inner surface of a torus, it will be apparent to those skilled in the art that the optical power in the tangential plane can be much different from the optical power in the sagittal plane. Therefore, over the relatively small portion of the windshield which is used as a combiner, its geometry may be approximated by a portion of an inside surface of a cylinder. It is therefore believed that, given the relative tolerance for distortion of the type of symbols generated by the preferred embodiment, an anamorphic fresnel lens, or other anamorphic lens, could be used to embody lens 12 in practical embodiments of the present invention.

Figure 8:
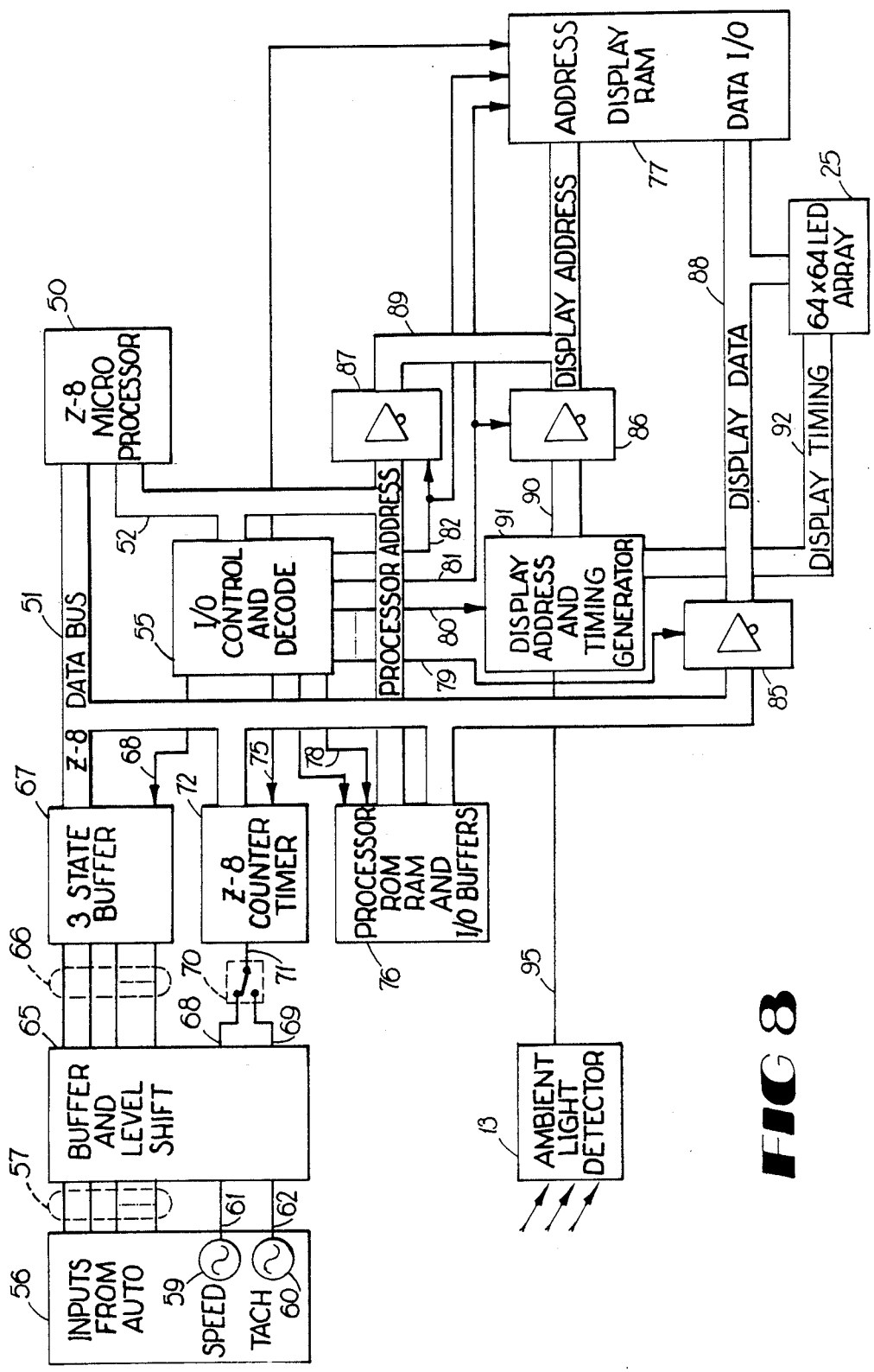
FIG. 8 is a schematic diagram of the controller for the symbol generator of the preferred embodiment.
Figure 9A:
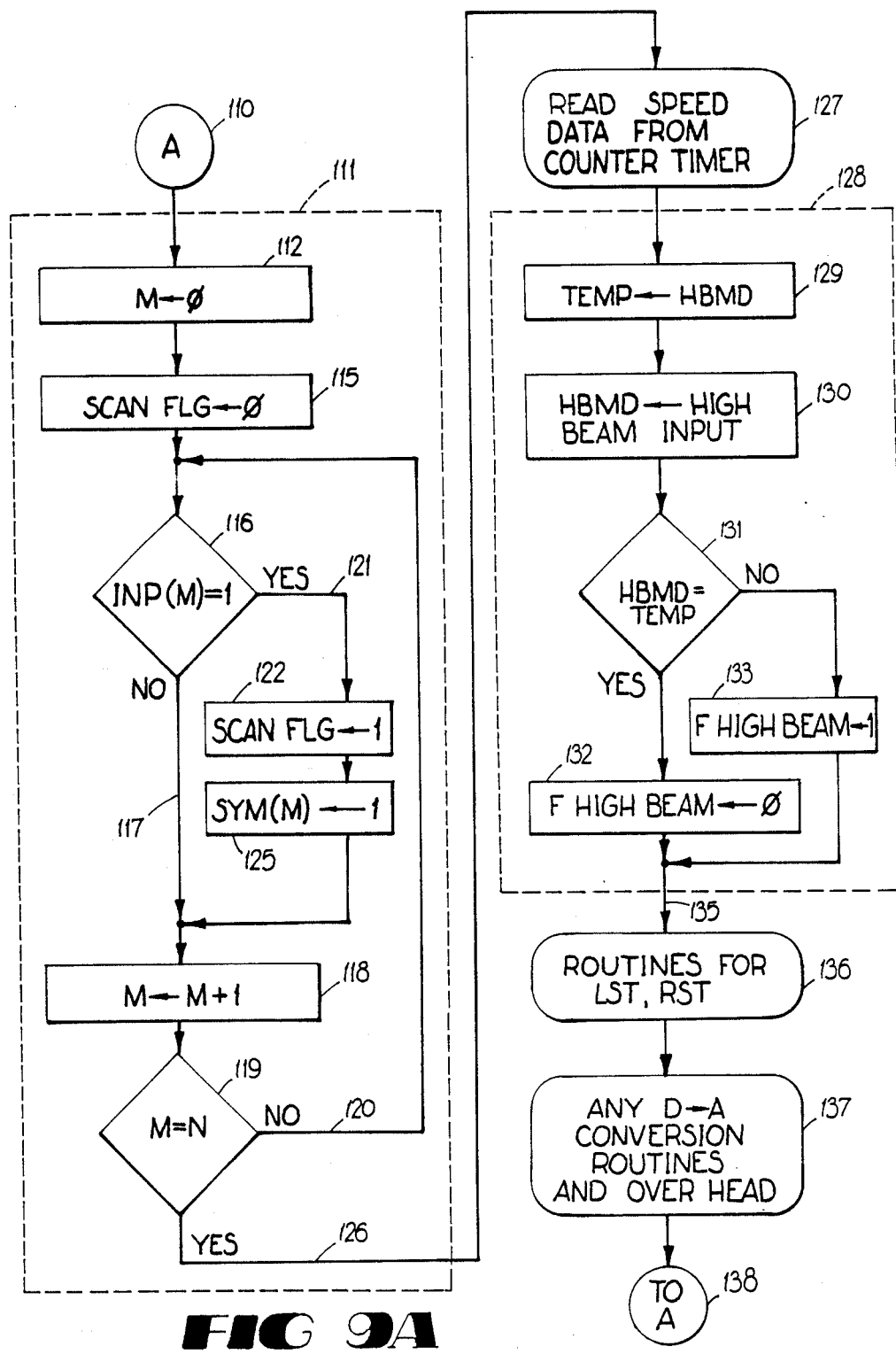
FIG. 9, consisting of FIGS. 9A and 9B, is a flow diagram for the logic controlling the microprocessor for the symbol generator controller of the preferred embodiment.
Figure 9B:
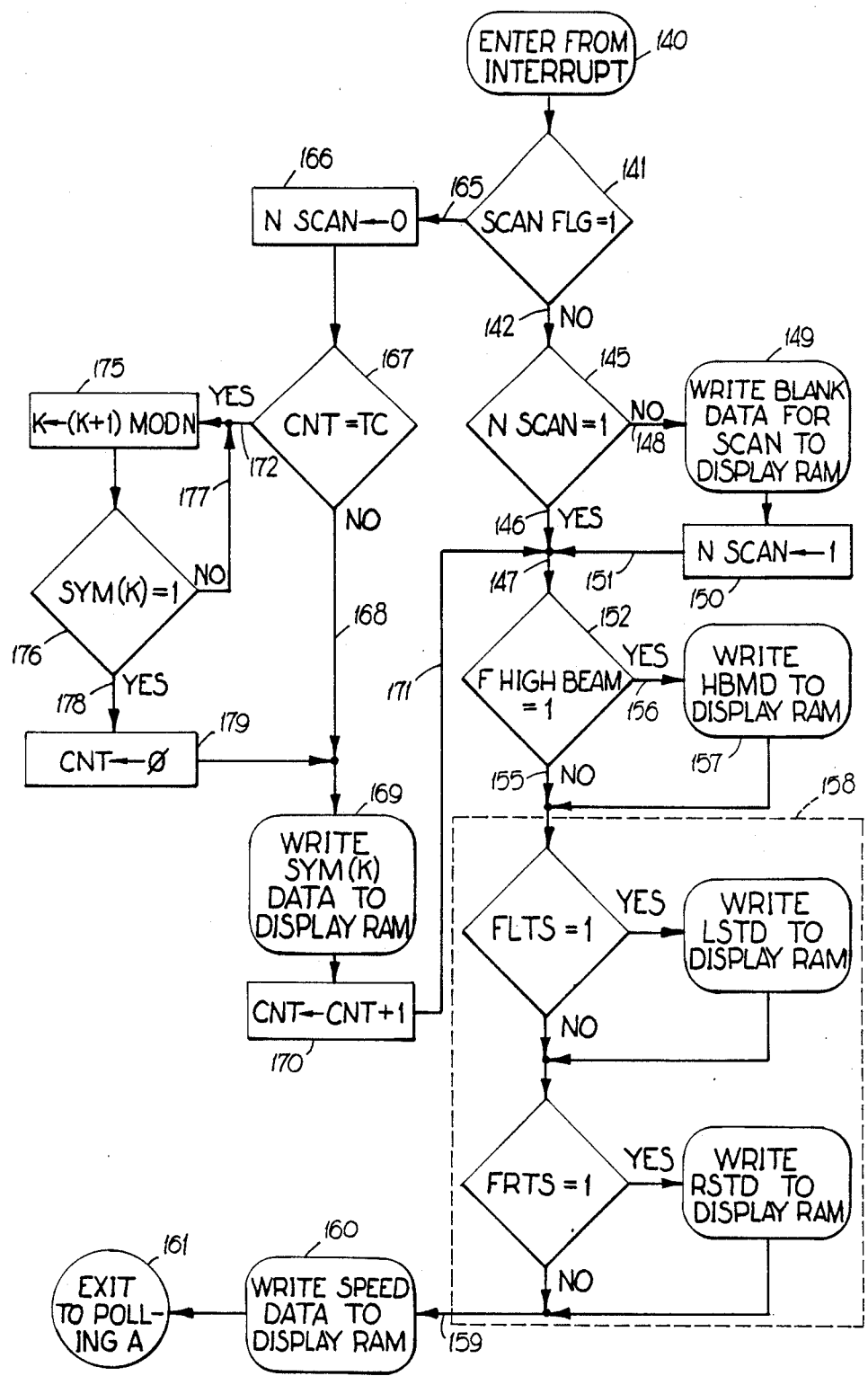

The electronics controlling the symbol generator of LED array 25 are shown in FIGS. 8 and 9. FIG. 8 is a block schematic diagram of the microprocessor based controller for the symbols. FIG. 9, consisting of FIGS. 9A and 9B, is a logical flow chart showing one implementation of the logic controlling the microprocessor of FIG. 8 used in the preferred embodiment.

A Z8 microprocessor 50 of the type currently manufactured by Zilog Incorporated of Cupertino, Calif. is used to control and generate the display of the symbols described in connection with FIG. 2 in array 25. Structure and programming of the Z8 microprocessor will be familiar to those skilled in the art. One port of the Z8 is used to implement the Z8 data bus 51 and two other ports are used to implement the processor address bus shown as 52. The controller for the preferred embodiment is memory mapped and therefore the input/output (I/O) devices are assigned to a particular portion of the addressable memory space of processor 50. Implementation of such functions by decoding, and following the standard procedures defined by Zilog for the Z8, will be known to those skilled in the art. This function is represented by block 55 which implements standard I/O control and address decoding.

The external inputs to the controller are indicated in block 56 as the inputs from the automobile. These include a plurality of lines 57 which represent two state lines. These inputs are used to control display elements representing the status of conditions in the car which are binary in nature. Such inputs can be indicated by the presence or absence of voltage of a particular level, or by switch closures to ground and the like. For example, when the headlamps are on, either the high beam switch is on or off. This is all the information that needs to be transmitted from the inputs 56 to the controller shown in FIG. 8. Similarly, all the doors are either closed, or at least one door is ajar, and thus the input corresponding to the door ajar status need only have an on or off state.

It should be stated at this point that certain analog signals detected by transducers within the automobile may be converted to binary signals externally to the controller of FIG. 8, or the analog signals may be provided directly from block 56 to conversion circuitry (not shown) associated with processor 50. For example, temperature and oil pressure transducers used in automobiles are often two terminal variable resistance devices where the resistance between the terminals indicates the value of the measured quantity. There are a number of well known devices for converting these signals to a binary level indicating that the quantity measured is either within an acceptable range or outside the acceptable range.

For example, the transducer may be used as part of a voltage divider, the voltage from which is supplied to a comparator circuit to indicate whether or not it is within an acceptable range. Also, there is sufficient processor time available in processor 50 of the preferred embodiment to do conversions directly. For example, one port of processor 50 could use several lines to implement an RC charging circuit in which the resistance of the transducer formed part of the resistance determining the charging time constant. Processor 50 can periodically discharge the capacitor and allow it to charge through a resistive network including the transducer. The internal counter/timer of the Z8 may be used to detect when the voltage on the capacitor exceeds the logical one threshold level and the time it takes (measured by the counter/timer) can be calibrated to transducer resistance, and thus the value of the measured quantity.

However, for the sake of simplicity it is assumed that any conversions for such warning light signals have been made external to the controller shown in FIG. 8. In addition to the binary inputs from the automobile shown within block 56, inputs representing the automobile's speed and crank shaft rotational speed are shown at 59 and 60, respectively. These are graphically represented as alternating current sources showing that the inputs provided to the controller are pulse trains or signals of a frequency corresponding to the speed of the automobile or the rotational speed of the engine crank shaft. These pulse train outputs are provided on lines 61 and 62, respectively.

All the inputs from block 56 are buffered and level shifted as shown at block 65. Since many of the inputs 57 are derived from the 12-volt system of a conventional automobile, it is necessary to buffer and shift the level of these signals to a level appropriate to the 5-volt power supply (not shown) used with the controller.

The lines carrying the buffered and level shifted inputs from input lines 57 are shown collectively as 66. They are provided as inputs to an array of three state buffers 67, which are selectively activated by a signal on line 68, to connect these inputs to the Z8 data bus 51. Line 68 comes from I/O decoder 55. It should be understood that the conventional Z8 data bus has eight bit lines and when more than eight input lines are included in lines 66, line 68 will actually be embodied by more than one signal line to select an appropriate set of buffers from within buffer array 67 to sequentially connect appropriate ones of lines 66 to data bus 51. This type of data input is well known to those skilled in the art.

The buffered inputs from speed indicator 59 and tachometer signal line 60 are shown as 68 and 69 as they exit block 65. User switchable selection between a numerical display of speed and a numerical display of engine revolutions per minute (the tachometer function) is indicated by switch 70. It should be understood that switch 70 may be embodied in software, analog switches, physical switches and the like. It is shown in FIG. 8 for the purpose of demonstrating that the present invention contemplates display of both automobile speed and a tachometer function.

In normal operation, line 68 is connected through switch 70 to line 71 which provides the input to a Z8 external counter/timer 72. This device is a well known member of the Z8 chip set and is used for data acquisition of the type described herein. Suffice it to say that the counter in counter/timer chip 72 is periodically reset and the number of pulses appearing on line 71 during a predetermined time interval are counted. When this process is complete, an active signal on line 75 from I/O and address decoder 55 reads the value from the counter onto data bus 51. The number of pulses counted during a predetermined time is an indication of the speed at which the car is traveling.

Calibration between the number of pulses counted and the speed of the automobile is provided in look-up tables within system memory 76. System memory 76 includes the read only memory (ROM) and random access memory (RAM) used by microprocessor 50. All of the executable code, as represented in FIG. 9, is stored in the ROM portions of processor memory 76. Memory 76 is indicated as being the processor memory in order to distinguish it from the display random access memory 77 which is also shown on FIG. 8. It should be understood that information indicating which diodes of array 25 should be lighted to generate the standard symbols is stored in ROM within processor memory 76 and provided, as described hereinbelow, to display RAM 77.

One experimental embodiment of the present invention has been constructed in which a serial I/O port (not shown) is provided as an interface to processor buses 51 and 52 to allow data to be externally loaded into the RAM portions of memory 76. In this embodiment, the ROM portion contains standard values for the LED control signals to generate standard symbols and the user may selectively load other symbols into a portion of RAM. In this embodiment, in the absence of user selected non-standard symbols, data corresponding to standard symbols as loaded from the ROM portion into the RAM portion of memory 76 on power-up. However, implementation of such a feature in practical embodiments of the present invention may unduly increase the expense.

It should be noted that Z8 microprocessor 50 also includes a conventional control bus for controlling reading and writing of data to and from memory and other peripheral devices. The structure of and timing relationships for this control bus are well-established and logical combinations of signals on the control bus to implement the embodiment described herein will be apparent to those skilled in the art. For the sake of simplicity, there has been no separate showing of the control bus functions on FIG. 8.

A collection of lines shown as 78 provide conventional signals for controlling the particular chips within processor memory 76 which are connected to buses 51 and 52 during operation.

Also shown as outputs from I/O controller and decoder 55 are four lines 79–82. Lines 79, 81 and 82, control a plurality of buffers 85–87, respectively. These buffers selectively connect and disconnect display data bus 88 and display address bus 89 from processor data bus 51 and processor address bus 52, respectively. Additionally, buffer 86 is used to selectively connect display address bus 89 to an output bus 90 from display address and timing generator 91.

Display address and timing generator 91 consists of a series of counters and logic gates used to sequentially generate appropriate addresses on output bus 90 for addressing the contents of display RAM 77. Additionally, generator 91 generates display timing signals on display timing bus 92.

In the preferred embodiment of the present invention, 64×64 LED array 25 is arranged in a configuration where each of the sixty-four rows of the LEDs are tied in a common anode arrangement. Similarly, the sixty-four LEDs constituting each column of the array are tied with common cathodes. Such a connection arrangement for a diode array is well known to those skilled in the art. Suffice it to say that the concurrence of a high voltage level on the anodes of a particular row and an active path to ground from the cathodes tied to one of the columns will cause the particular diode at that row/column intersection to become lighted. The necessary timing and control for controlling such an array in a multiplexed fashion, in order to generate symbols of the type shown in FIG. 2, is well known to those skilled in the art.

In the exemplary embodiment, the data from display RAM 77 is provided so that, as each row is scanned with an active signal, all of the columns for which a diode in that particular row are to become lighted are connected to ground. Next, generator 91 steps to put an active signal on the next row and the appropriate ground connections on particular columns, as indicated by data in display RAM 77 connect selected columns to ground to light the appropriate diodes in the next row. This continues sequentially.

Naturally, the multiplexing is accomplished at a sufficient rate so that the display does not seem to flicker. This is not a problem in a practical implementation due to the visual persistence of the human eye which causes an integrating function to take place causing the display to appear to be constantly illuminated to the viewer.

As will be described in greater detail in connection with FIG. 9, processor 50 is constantly polling inputs 66 and reading data from counter/timer 72 in order to determine what symbols should be provided in the display on array 25. Periodic interrupts are internally generated by processor 50. In the preferred embodiment, these interrupts are generated every 300 milliseconds.

The interrupt service routine causes I/O controller 55 to control buffers 85-87 in the following fashion. Buffers 85 and 87 are activated to connect the processor address bus 52 to display address bus 59 and processor data bus 51 to display data bus 88. This has the effect of connecting display RAM 77 to the processor buses. Buffer 86 has its outputs placed in a high impedance state disconnecting address bus 90 from display address bus 89. Also, the active signal on line 80 causes display address and timing generator to enter a wait state terminating clocking of the counters used to generate addresses. One or more of the control lines in display timing bus 92 is used to disconnect the array 25 from the inputs on display data bus 88 so that indeterminant signals will not be displayed in the array while the contents of RAM 77 are updated.

Once this state is entered, processor 50 polls a state table within processor RAM 76 to determine the appropriate signals to be displayed. When the particular signals are located, data stored in the ROM portion of processor memory 76 is loaded into display RAM 77. When this routine has been serviced in response to the interrupt, the above-referenced buffers are returned to their normal state in which bus 90 is connected to bus 89 and processor 50 again commences polling of the inputs from block 56. Therefore, during this state of the display, display address and timing generator 91 is in a free running state constantly providing the data from display RAM 77 to array 25.

It should be understood that the data in display RAM 77 is a collection of data bits which directly drives the members of the array to generate the appropriate signals. The processor need only transfer that data, stored in a table, in response to detection of a particular condition.

For example, if processor 50 determines that the particular line of lines 57 indicating that the high beam headlamps are illuminated is active, this will be stored in an address corresponding to that variable within the RAM portion of the processor 76. Upon the occurrence of the next 300 millisecond interrupt, the processor 50 will note that the high beam input is active. In response to this, data will be provided from the read only memory portion of processor memory 76 to the portion of display RAM 77 which controls the array members in section 21 shown in FIG. 2. The adoption of this arrangement allows virtually all of the circuitry shown in FIG. 8 to be standardized and lets the user generate different symbols, or even other information, only by changing the contents of the ROM portion of processor memory 76.

Since the interrupts for updating the contents of display RAM 77 occur every 300 milliseconds, it will be appreciated that the speed or tachometer reading displayed in array 25 will be updated every one-third second and something slightly greater than one-third second will be the maximum delay between change of the warning light status inputs and the display of the appropriate symbol in array 25.

Ambient light detector 13, described in connection with FIG. 1, is also shown on FIG. 8 providing an analog output signal on line 95. In the preferred embodiment, this signal is provided as an input to display address and timing generator 91 to control the duty cycle of the signals activating elements of array 25, and therefore to control the brightness of the display output. Other arrangements may be used to vary brightness of the display either apart from it or in conjunction with ambient light detector 13. For example, it is considered preferable to provide a user operable potentiometer to control the brightness of the display. Similarly, the brightness of the display may be automatically reduced in response to detection of headlamp illumination indicating that it is probably dark outside the car and the intensity of the display should be reduced.

FIG. 9 shows a diagrammatic representation of the logic for the program within the ROM portion of processor memory 76 which controls processor 50 (FIG. 8). FIG. 9A shows the substantially conventional polling logic for data acquisition when the processor is polling input lines 57 and reading data from counter/timer 72 (FIG. 8). While FIG. 9 does not constitute a detailed assembly language flow chart, implementation of the appropriate instructions in the Z8 instruction set will be well known to those skilled in the art.

Turning first to FIG. 9A, an entry point A is shown at 110. This point in the flow diagram leads to a block labelled 111 in which the binary or warning light inputs from the automobile are scanned. A counter variable M is set to zero at step 112 and a flag variable called SCANFLG is cleared at step 115. As will become apparent in connection with the description of FIG. 9B, the SCANFLG flag is used to determine what data should be loaded into the portion of display RAM 77 which controls sector 27 of array 25 as shown in FIG. 2. It should be recalled that this sector of the array is the one in which the warning light symbols are displayed and may be displayed sequentially. The rest of block 111 consists of a loop which scans each of N possible inputs from lines 57 to determine if the line is active. The signal on a particular one of lines 66 corresponding to that variable is given the variable name INP(M).

A test for whether this particular input is active is conducted at step 116. If the input is not active, branch 117 is taken and the counter variable M is incremented at step 118. Next, loop variable M is tested to see if it has reached its maximum value at step 119. If has not, NO branch 120 is taken from this step which returns to step 116 to test the next input line. In the event that an active condition is detected on one of the input lines, YES branch 21 is taken from step 116. The SCANFLG variable is set to one at step 122 and a variable for the particular warning light symbol, shown as SYM(M) is set to one at step 125. Alternatively, the status of lines 66 (FIG. 8) may be read into eight bit words and a non zero value for all words indicates that SCANFLG should be set to one.

When all of the binary or warning light inputs have been tested, YES branch 126 is taken from step 119 to a routine 127. This routine reads the value of the counter in the Z8 counter/timer chip 72 which will be used to display a numerical representation of the car's speed. From this, a simple routine shown as 128 is entered to test the states of the three variable controlling sectors 19, 20 and 21 shown on FIG. 2. The variable corresponding to the high beam status is shown as HBMD for "high beam data" on FIG. 9. At step 129, this value is transferred to a temporary variable TEMP. Next, the HBMD variable is loaded with the value of the high beam input as determined from the particular one of input lines 57 corresponding to high beam at step 130. At step 131, the present value of the high beam is tested against its previous value and the TEMP variable. If it is the same, a flag variable FHIGHBM is cleared at step 132 and if it is different the flag is set at step 133. The FHIGHBM flag variable is used to determine whether new data should be written out to display RAM 77.

When this is completed, branch 135 is taken to a set of routines at 136 indicated as the routines for the left turn signal (LST) and the right turn signal (RST). It should be understood that these routines are substantially identical to routine 128 for the high beam indicator. When these have been completed, any other work to be done by the processor is shown collectively at 137. If any D/A conversions of the type described hereinabove are to be performed by the controller, such as conversion of the resistance of a temperature transducer to a binary number, they are done at this point. Also, any other system overhead requirements are conducted as a part of routines indicated at 137. When these are completed, the program exits to point 138 which is a return to entry point 110.

As noted above, processor 50 generates internal interrupts every 300 milliseconds in order to service display RAM 77. It will be apparent to those skilled in the art that it may be appropriate to mask this interrupt during certain portions of the program shown in FIG. 9A. For example, before step 115, it may be appropriate to mask the interrupt until branch 126 is reached so that an improper value for the variable SCANFLG will not be transferred to the display RAM service routine. Such expedients are well known to those skilled in the art and need not be described in detail.

FIG. 9B shows a representation of the service routine for writing data to display RAM 77 (FIG. 8). Proceeding with the description of FIG. 9B, it should be stated that several flag variables are used in the described embodiment for determining whether or not data needs to be written to particular portions of display RAM 77. The writing of this data can be relatively time consuming. Since it is contemplated that other features may be added to the display controller of the present invention, it is believed preferable to avoid the unnecessary transfer of blocks of data between processor memory 76 and display RAM 77. However, it should be readily appreciated that other implementations of control logic may be used in embodiments of the present invention in which the entire contents of the display RAM are loaded each time the display RAM service routine is entered, irrespective of whether there is a change in the display from the last time the RAM contents were loaded. Thus, the description of the routine using flags in order to avoid transferring data from certain segments of RAM 77 is considered exemplary and not limiting of the scope of the present invention.

The entry point for display RAM service routine is shown at 140. First, the SCANFLG variable is tested at point 141. If this variable is equal to one, this indicates that at least one symbol is to be displayed in sector 27 of the array (FIG. 2). If this flag is zero, nothing is to be displayed in sector 27 and NO branch is taken from this step.

Next, a flag variable NSCAN is tested at step 145. This flag name is chosen to suggest "no scan" and is active when the present contents of the portion of display RAM 77 controlling sector 27 is such that nothing will be displayed in this sector. If this flag is set, YES branch 146 is taken which in turn carries the logic flow to branch 147. This path will be followed when none of the warning light variables are to be displayed in sector 27 (as determined at step 141) and the appropriate data for generating no display in sector 27 is already loaded into display RAM 77, as determined at step 145.

If the routine is entered and, since the last time data was written into RAM 77, the SCANFLG variable is changed from one to zero, NO branch 148 will be taken from step 145. This will occur when the data in the above-reference particular portion of RAM 77 indicates the display of one of the warning light symbols and this data needs to be replaced with data which will blank that sector of the array. This routine is shown at 149 wherein the processor writes data appropriate for providing no display in sector 127 into RAM 77. When this is accomplished, the NSCAN flag is set to one at step 150 and branch 151 leads to branch 147.

From branch 147, a series of simple steps are taken to determine whether the high beam or the left or right turn signal indicators are to be displayed in sectors 19–21 (FIG. 2). As described in connection with routine 128 on FIG. 9A, the flag variable FHIGHBM is set to one if there has been a change in the status of the high beam indicator input since the last time the display RAM service routine was executed. This is tested at step 152. If the status is the same, branch 155 is taken to the next test.

If the FHIGHBM variable is set to one, the data in the portion of RAM 77 controlling sector 21 (FIG. 2) must be changed and YES branch 156 is taken from step 152. This leads to a routine 157 which simply writes data corresponding to the state of the HBMD variable to the display RAM. Note that the HBMD variable is binary (see step 130 on FIG. 9A) and the program controlling processor 50 is directed to pull the appropriate data from one of the stored tables in processor memory 76 and transfer it to display RAM 77.

Flag variables FLTS and FRTS are the flag variables corresponding to FHIGHBM which were set or cleared in the routine shown at 136 on FIG. 9A for the left and right turn signals. These are tested and appropriate action is taken if they are set to one in the block of steps shown as 158. The steps shown as 158 are exited via branch 159 to a routine 160 which writes the appropriate data for indicating the speed of the automobile to the portion of RAM 77 controlling sector 22 of array 25 (FIG. 2). When this has been accomplished, the program is exited at step 161 which returns to the polling routine at entry point A shown on FIG. 9A.

The above-described steps will be executed each time the display RAM service routine is entered so long as none of the warning light variables need to be displayed in sector 27. If a condition exists which requires the display of one of these symbols, YES branch 165 will be taken from 141 in response to detection that the SCANFLG variable is set. When this occurs, the NSCAN flag is cleared at 166 and a test of whether a counter variable CNT is equal to its terminal count (TC) is made at step 167. The variable CNT is used as a timing variable to determine the rate at which the warning light indicators are displayed in sector 27 when the conditions in the automobile indicate that more than one warning indicator should be displayed.

As described hereinabove in connection with FIG. 2, if conditions are such that the low fuel and door ajar symbols should be displayed, it is necessary that they be displayed for a sufficient period of time in which to attract the attention of the driver. This is because changing the displayed symbol every half second would, in all probability, lead to a very confusing and unreadable display being provided to the driver. Therefore, the number of counts for the CNT variable which corresponds to the length of time that each individual warning light symbol should be displayed is selected to be equal to the constant TC. Since display of each symbol for more than one-half second is believed appropriate, if the CNT variable has not reached its terminal count, NO branch 168 is taken and data for the particular warning light symbol, indicated by the variable SYM(K) is written to the display RAM at step 169. When this is completed, the CNT variable is incremented by one at 170 and branch 171 leads to the common branch 147 described hereinabove.

If the timing variable CNT has reached its terminal count, this is detected at step 167 and YES branch 172 is taken. This leads to a loop consisting of steps 175 and 176 in which the next active warning light input is found. A loop counting variable K is incremented and operated on by the arithmetic operator modulo N as indicated at 175. With N being the number of possible warning light symbols to be displayed in 27, the loop counter variable K will taken on values 0 to N−1.

At step 176, the contents of the next variable SYM(K) is tested to see if it is one. This will have been set to one at step 125 (FIG. 9A) in response to detection of an appropriate input. If the Kth SYM variable is not active, branch 77 will loop the program back to increment K until the active SYM variable is detected and branch 178 is taken. Inspection of routine 11 on FIG. 9A will indicate that the loop including steps 175 and 176 will not be entered unless at least one of the SYM variables is in an active condition. It is noted that this routine will operate correctly in the event that one and only one of the warning light indicators is active and routine 161 will simply write the same data out to RAM 77 each time the CNT variable times out. When YES branch 178 is taken, the symbol timer variable CNT is cleared at step 179 and the appropriate data for controlling sector 27 is written out to display RAM 77.

As stated above, the logical flow on FIGS. 9A and 9B is only exemplary, and there are many other ways to control the display in array 25 in constructing embodiments of the present invention. For example, it may also be desirable to provide an intermittent blanking of sector 27 between the display of successive variables. This may be accomplished in a number of ways, and is a matter of design choice to be determined primarily to the subjective reaction of drivers to the timing and sequencing of the warning light displays in sector 27.

One simple way of accomplishing a half second blanking between displays is simply to test the CNT variable between steps 140 and 141 each time the display RAM service routine was entered. If the variable had timed out, the SCANFLG flag variable could be cleared prior to executing step 141. This would assure that data for blanking sector 27 was written out to RAM 77. This step could be by-passed through the use of one or more flag variable which is complemented each time the SCANFLG variable was cleared in response to CNT equaling its terminal count. Such an arrangement would assure that a one-half second blanking took place between each successive display of a warning light symbol in sector 27. Such an arrangement would also cause the warning light symbol to flash if one and only one warning light variable was active, thus causing the urgency of the condition to be brought to the driver's attention.

Based on the foregoing description of the preferred embodiment, other embodiments of the present invention will suggest themselves to those skilled in the art. Additionally, it should be understood that the present invention is not limited to the environment of a passenger automobile but may also be embodied in a large number of vehicles, particular those including windshields. Since the major design problem in approaching the present invention was creation of an inexpensive and compact head-up display which could withstand the environments encountered in a passenger automobile, it will be readily appreciated that this type of display could also be placed in power boats, general aviation aircraft, and other vehicles. Therefore, the scope of the present invention is to be limited only by the claims below.

We claim:

1. A head-up display for use in a passenger vehicle of the type including signal means for providing a plurality of electrical status signals and a windshield having a first optical power in a first plane and a second optical power in a second plane, comprising in combination:

an array of selectively actuable light-emitting elements for providing visible patterns;

means defining a folded optical path from said array to an exit pupil, said optical path including at least one mirror;

an astigmatic magnifying lens having a third optical power in a third plane and a fourth optical power in a fourth plane and positioned at said exit pupil for providing a quasicollimated distorted beam for projection onto said windshield to provide a magnified virtual image in an image plane located between a foreground plane at said combiner glass and a plane at infinity, said third optical power compensating for said first optical power and said fourth power compensating for said second optical power to provide for focusing of said magnified virtual image; and display control means connected to said signal means and said array for causing said array to provide said visible patterns corresponding to said status signals.

2. A head-up display as recited in claim 1 wherein said status signals include a speed signal indicating the speed at which said passenger vehicle is traveling, and a plurality of warning signals; and said display control means is operative to cause said array to constantly display a first one of said visible patterns corresponding to said speed signal and to alternately display two distinct ones of said visible patterns corresponding to two distinct ones of said warning signals when more than one of said warning signals is active.

3. A head-up display as recited in claim 1 wherein said array comprises an LED array.

4. A head-up display as recited in claim 1 wherein the astigmatism of said lens partially compensates for the astigmatism of said combiner glass.

5. A head-up display as recited in claim 1 wherein the length of said optical path, the size of said exit pupil, and the size of said array are selected so that a predetermined three-dimensional eye box is defined in the interior of said passenger vehicle, centered at a predetermined location, for which the ratio of the instantaneous field of view of said array from a point inside said eye box over the total field of view of said array from said point inside said eye box exceeds 1.5.

6. A head-up display for use in a passenger vehicle of the type including signal means for providing a plurality of electrical status signals and a windshield characterized by a first optical power in a first plane and a second optical power in a second plane, comprising in combination:

a display image source for providing visible patterns;

means defining an optical path from said display image source to an exit pupil;

a corrective lens positioned at said exit pupil and charcterized by a third optical power in said first plane and a fourth optical power in said second plane wherein the combination of said first and second optical power of said windshield and said third and fourth optical power of said lens provides a virtual image of said visible patterns with predetermined magnification and at a predetermined distance from the center of a predetermined eyebox defined within said passenger vehicle; and display control means connected to said signal means and said display image source for causing said display image source to provide said visible patterns corresponding to said status signals.

7. A head-up display as recited in claim 6 wherein said display image source comprises an LED array.

8. A head-up display for use in a passenger vehicle of the type including signal means for providing a plurality of electrical status signals, comprising in combination:

a display image source for providing visible patterns characterized by a predetermined two-dimensional image size;

means defining an optical path from said display image source to an exit orifice, said exit orifice being characterized by a predetermined two-dimensional pupil size;

a lens positioned at said exit orifice for directing light rays from said display image source passing through said exit orifice to a combiner glass, said lens and said combiner glass each being characterized by a respective pair of optical powers so that the combination of said pair of optical powers of said combiner glass and said pair of optical powers of said lens provides a virtual image of said visible patterns as said light rays are reflected from said combiner glass;

display control means connected to said signal means and said display image source for causing said display image source to provide said visible patterns corresponding to said status signals;

wherein the length of said optical path, said pupil size, and said image size are selected so that a predetermined three-dimensional eyebox is defined in the interior of said passenger vehicle, centered at a predetermined location, for which the instantaneous field of view of said display image source from a point inside said eyebox is at least 1.5 times the total field of view of said display image source from said point inside said eyebox.

9. A head-up display as recited in claim 8 wherein said display image source comprises an LED array.

10. A head-up display for use in a passenger vehicle of the type including signal means for providing a plurality of electronic status signals, and an astigmatic windshield having a first non-zero optical power in a first plane and a second non-zero optical power in a second plane, comprising in combination:

a display image source providing visible patterns characterized by a predetermined two dimensional image size;

means defining a folded optical path from said display image source to an exit orifice, said exit orifice being disposed below said astigmatic windshield and characterized by a predetermined two dimensional pupil size;

a linear cross Fresnel lens, located at said exit orifice, having a third optical power in a third plane and a fourth optical power in a fourth plane for providing a quasi-collimated distorted beam for projection onto said astigmatic windshield to provide a magnified virtual image in an image plane located between a foreground plane at said astigmatic windshield and a plane at infinity, said third optical power compensating for said first optical power and said fourth optical power compensating for said second optical power to provide for focusing of said magnified virtual image; and display control means connected to said signal means for causing said display image source to provide said visible patterns corresponding to said status signals;

wherein the length of said optical path, said pupil size, and said image size are selected so that a predetermined three dimensional eyebox is defined in the interior of said passenger vehicle, centered at a predetermined location, for which the instantaneous field of view of said display image source form a point inside said eyebox is at least 1.5 times the total field of view of said image display source from said point inside said eyebox.

* * * * *